United States Patent [19]

Barda et al.

[11] 4,401,778
[45] Aug. 30, 1983

[54] FLAME RETARDANT THERMOPLASTIC COMPOSITIONS

[75] Inventors: Henry J. Barda, North Brunswick; Joseph M. Lesniewski, Hopewell, both of N.J.

[73] Assignee: Saytech, Inc., Sayreville, N.J.

[21] Appl. No.: 303,159

[22] Filed: Sep. 17, 1981

[51] Int. Cl.³ .............................................. C08K 5/34
[52] U.S. Cl. ........................................ 524/89; 521/88; 521/115; 521/118; 528/73; 548/433; 548/478
[58] Field of Search ............... 260/326 C; 524/94, 89; 548/433, 478

[56] References Cited

U.S. PATENT DOCUMENTS

| | | | |
|---|---|---|---|
| 3,234,233 | 2/1966 | Bolger | 260/326 C |
| 3,371,099 | 2/1968 | Geiser | 260/326 C |
| 3,454,530 | 7/1969 | Case et al. | 260/75 |
| 3,542,805 | 11/1970 | Cyba | 524/94 |
| 3,565,812 | 2/1971 | Anderson et al. | 252/182 |
| 3,585,185 | 6/1971 | Levis, Jr. et al. | 260/210 |
| 3,634,314 | 1/1972 | Cyba | 524/94 |
| 3,639,541 | 2/1972 | Austin et al. | 260/952 |
| 3,639,542 | 2/1972 | Pizzini et al. | 260/952 |
| 3,642,646 | 2/1972 | Marcus et al. | 252/182 |
| 3,676,376 | 7/1972 | Svoboda et al. | 260/2.5 AV |
| 3,678,073 | 7/1972 | Borden et al. | 260/326 C |
| 3,734,758 | 5/1973 | Cyba et al. | 106/193 R |
| 3,784,509 | 1/1974 | Dotson et al. | 524/94 |
| 3,989,653 | 11/1976 | Baldino et al. | 260/2.5 AJ |

FOREIGN PATENT DOCUMENTS 993451  7/1976  Canada ............................ 260/472.3

OTHER PUBLICATIONS

Spatz et al., in "Industrial and Engineering Chemical Product Research and Development", vol. 8, No. 4, pp. 397-398 (1969).

Primary Examiner—Veronica P. Hoke
Attorney, Agent, or Firm—D. L. Johnson; John F. Sieberth; Teresa M. Stanek

[57] ABSTRACT

A flame retardant thermoplastic polymer containing a flame retardant amount of a flame retardant additive mixture. The mixture is comprised of halogenated imide-containing polyols having the formula:

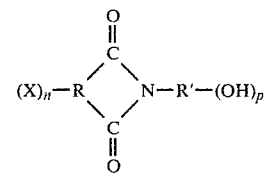

and the corresponding ethers having the formula:

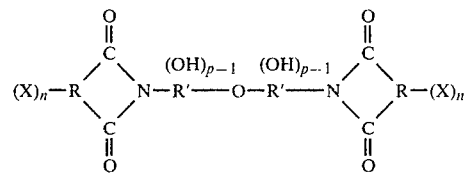

wherein R is a hydrocarbon group having the valence n+2 and is selected from the group consisting of benzene groups, naphthalene groups and alicyclic hydrocarbon groups containing 5 to 10 carbon atoms, X is selected from the group consisting of bromine and chlorine, n is an integer from 1–6 and p is an integer from 2–6. The preferred flame retardant mixture is a derivative of tetrabromophthalic anhydride.

16 Claims, No Drawings

FLAME RETARDANT THERMOPLASTIC COMPOSITIONS

BACKGROUND

1. Field of the Invention

This invention relates to the novel use of flame retardant additives in polymers. More particularly, this invention relates to the use of halogenated imide-containing polyols as flame retardants in thermoplastic polymeric compositions.

2. Description of the Prior Art

The two major types of polymers are the thermosets and the thermoplastics. The thermoset polymers consist of those plastics which when subjected to heat, will normally become infusible or insoluble, and as such cannot be remelted. They have elaborately cross-linked three-dimensional structures and are used for plastics, elastomers, coatings and adhesives.

In contrast to the thermoset polymers, most thermoplastic polymers can be made to soften and take a new shape by the application of heat and pressure. Thermoplastics consist of long-chain molecules often without any branching (e.g., high density polyethylene). Even if there is branching (e.g., low density polyethylene) the polymer may still be two dimensional. Thermoplastic polymers consist of those plastics which normally are rigid at operating temperatures, but can be remelted and reprocessed. They include polyethylene, polypropylene, polystyrene, polyvinyl-chloride, acrylonitrile-butadiene-styrene (ABS), nylon, and the like.

The problem of the flammability of polymer compositions has received considerable attention. A variety of compounds exist that provide satisfactory flame resistance, smoke suppression and self-extinguishing properties. These conventional flame retarding agents are either reactive or additive. The reactive compounds are incorporated into the structure or backbone of the polymer. In contrast, additive flame retardants are only physically incorporated into the polymerized product. Additive compounds typically include tris(chloropropyl)phosphate and aluminum trihydrate.

Co-pending application Ser. No. 303,055 filed on Sept. 17, 1981 is directed to the use of halogenated imide-containing polyols and corresponding ethers as reactive flame retardants for polyurethanes. These same halogenated imide-containing polyols have now been found to be effective additive flame retardants for a variety of thermoplastic polymeric compositions.

It is known to use polyol esters of tetrabromophthalic anhydride as a reactive component in the preparation of flame retardant polyurethanes. U.S. Pat. No. 3,642,646 discloses polyol compositions useful in preparing rigid foam compositions. These polyols comprise the reaction adducts of polyfunctional aromatic carboxylic acid anhydrides or chlorendic anhydride and polyether polyols. It specifically teaches the use of half esters based on a polyol and tetrabromophthalic anhydride.

U.S. Pat. No. 3,585,185 discloses a process for preparing ester-containing polyols by the reaction of alkylene oxide condensates of organic compounds having at least two active hydrogen atoms with a halogen-containing organic acid anhydride and an alkylene oxide.

U.S. Pat. No. 3,454,530 teaches the use of polyols useful in the preparation of rigid polyurethane foams. These polyols are prepared by the reaction of a di- or tri-alkanolamine with a cyclic anhydride of an organic dicarboxylic acid and a lower alkylene oxide.

Canadian Pat. No. 993,451 discloses halogen-substituted aromatic amide-ester polyols and their use in a flame retardant flexible polyurethane foam.

U.S. Pat. No. 3,676,376 teaches the use of polyester polyols based on tetrabromophthalic anhydride, an aliphatic dicarboxylic acid, a polyol and an aliphatic diol.

U.S. Pat. No. 3,989,653 teaches the preparation of diesters of tetrabromophthalic anhydride by the reaction product of tetrabromophthalic anhydride and a polyhydroxy compound containing at least three hydroxyl groups.

Spatz et al in "Industrial and Engineering Chemical Product Research and Development," Vol. 8, No. 4, pages 397-8 (1969), teach the use of N-(2-hydroxyethyl)tetrabromophthalimide as a flame retardant in some thermoset polymeric compositions.

None of the references are directed to the halogenated imide-containing polyols and ethers of the present invention. These prior art flame retardants are limited in application to thermoset compositions or polyurethanes. In addition, they are reactive and thus are incorporated into the structure of the polymer itself.

U.S. Pat. Nos. 3,565,812, 3,639,541, and 3,639,542 are directed to the preparation of halogen-containing organic acid anhydrides based on ester- and phosphorus-containing polyols.

The prior art flame retardants are esters. They are intended for use in polyurethane compositions. They have lower hydrolytic and thermal stability than the flame retardant mixture in the present invention. In addition, production of the present halogenated imide-containing polyol and ether do not require the use of an alkylene oxide such as propylene oxide. This is advantageous because lower alkylene oxides are toxic, explosive and require the use of pressure equipment.

The flame retardants of the present invention are additive flame retardants and are dispersed throughout the polymer matrix. Traditionally, a flame retardant additive is incorporated into the thermoplastic polymeric composition after the thermoplastic polymer is completely formed. Under heat and pressure the thermoplastic polymer is melted and the flame retardant additive is blended in. Some state of the art additive flame retardants remain in solid form throughout this blending process. Therefore, an uneven dispersion of flame retardant into the final product frequently results. It has recently been discovered that the halogenated imide-containing polyols and corresponding ethers of the present invention melt during this blending step. Thus, a more even dispersion of flame retardant throughout the thermoplastic polymer matrix is achieved. This improved dispersion of the flame retardant additive allows for more efficient flame retardance and greater retention of useful polymer physical properties.

SUMMARY OF THE INVENTION

In accordance with the present invention, halogenated imide-containing polyols and the corresponding ethers are useful as flame retardant additives in the preparation of thermoplastic polymeric compositions.

DESCRIPTION OF THE PREFERRED EMBODIMENTS

The present invention relates to a thermoplastic polymer containing a flame retardant additive mixture. This flame retardant additive mixture is comprised of halogenated imide-containing polyols having the formula:

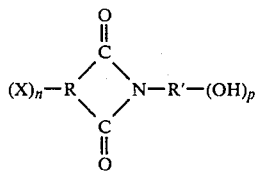

and the corresponding ethers having the formula:

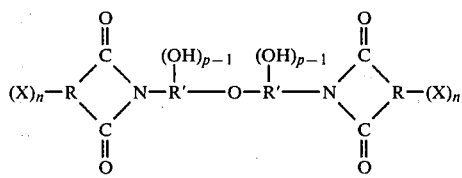

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3-12 carbon atoms, X is selected from the group consisting of bromine and chlorine, n is an integer from 1-6 and p is an integer from 2-6. X represents 1 to 6 bromine atoms, chlorine atoms or a combination thereof, including mono-, di-, tri-, and tetra-halo substituted phthalic anhydrides.

In a preferred embodiment of the present invention, R is benzene and R' is an aliphatic hydrocarbon group containing 5 carbon atoms. The number of hydroxy groups represented by p is 2, X is chlorine and n is 4. A more preferred embodiment of the present invention is a mixture comprising a halogenated imide-containing polyol having the formula:

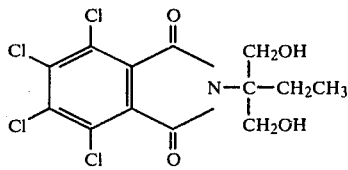

and the corresponding ether having the formula:

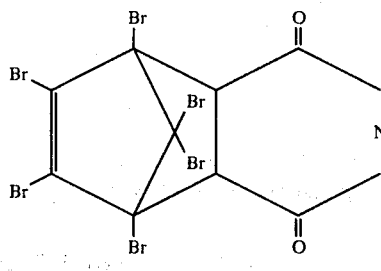

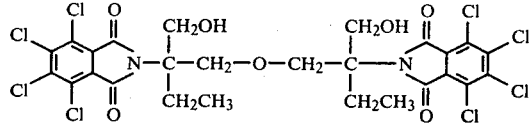

Still more preferably, R is benzene, R' is aliphatic group containing 5 carbon atoms, p is 2, X is bromine and n is 4. The most preferred embodiment of the present invention is a flame retardant additive mixture comprising a halogenated imide-containing polyol having the formula:

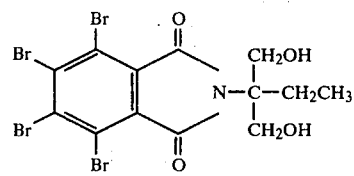

and the corresponding ether having the formula:

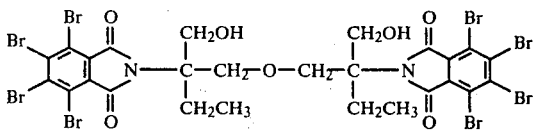

Alternatively, R may represent an alicyclic group. In this case, R is preferably 5-norbornene. R' is an aliphatic hydrocarbon group containing 5 carbon atoms. The number of hydroxy groups represented by p is 2. Preferably, X is bromine and n is 6. A preferred embodiment of the present invention is a flame retardant additive mixture comprising a halogenated imide-containing polyol having the formula:

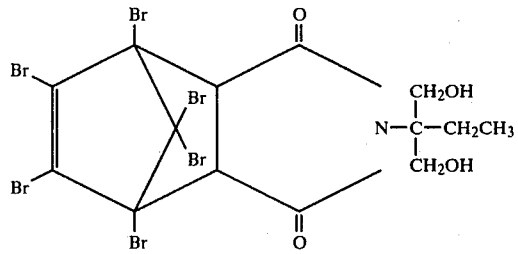

and the corresponding ether having the formula:

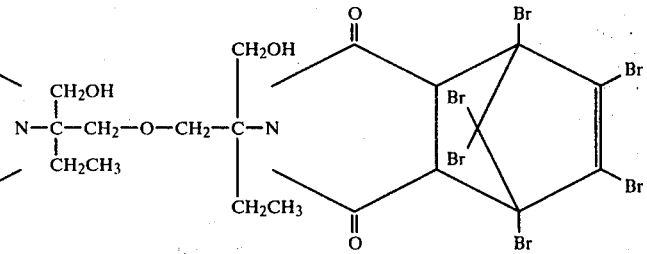

In another embodiment, R is 5-nonbornene, R' is an aliphatic hydrocarbon group containing 5 carbon atoms, p is 2, X is chlorine and n is 6. One of the more preferred embodiments of the present invention is a mixture comprising a halogenated imide-containing polyol having the formula:

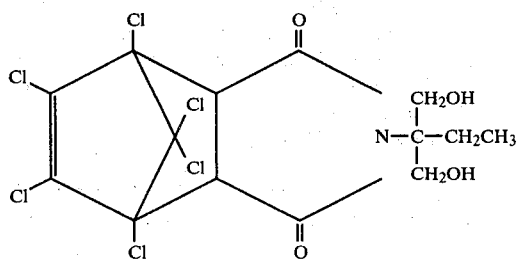

and the corresponding ether having the formula:

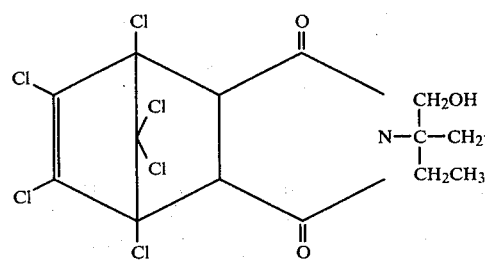

The preferred individual flame retardant additive compounds of the present invention to be used in thermoplastic polymer compositions are identical to those components of the flame retardant mixture identified above. Therefore, a preferred embodiment of the present invention is a compound having the following general formula:

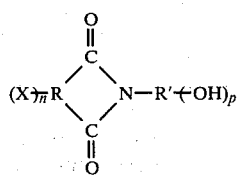

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3-12 carbon atoms, X is selected from the group consisting of bromine and chlorine, n is an integer from 1-6 and p is an integer from 2-6. X represents 1 to 6 bromine atoms, chlorine atoms or a combination thereof, including mono- di-, tri-, and tetra-halo substituted phthalic anhydrides.

In a more preferred embodiment of the present invention, R is benzene, R' is an aliphatic hydrocarbon group containing 5 carbon atoms, p is 2, X is bromine and n is 4. An even more preferred embodiment of the present invention is a halogenated imide-containing polyol having the formula:

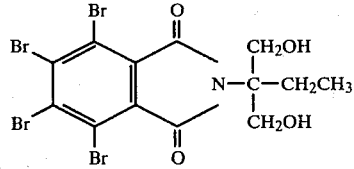

Alternatively, R may represent an alicyclic group. In this case, R is preferably 5-norbornene, R' is an aliphatic hydrocarbon group containing 5 carbon atoms, p is 2, X is chlorine and n is 6. A preferred embodiment of the present invention is a polyol having the formula:

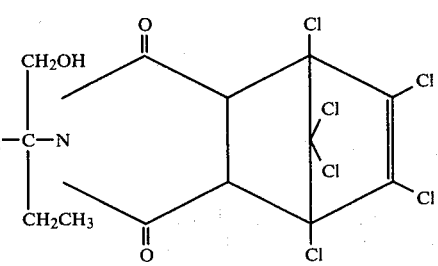

Ethers of the halogenated imide-containing polyols are compounds corresponding in structure to the halogenated imide-containing polyols described immediately above. Accordingly, another preferred embodiment of the present invention is an ether having the formula:

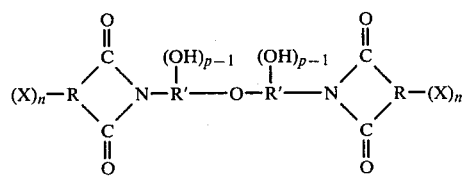

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3-12 carbon atoms, X is selected from the group consisting of bromine and chlorine, n is a integer from 1-6 and p is an integer from 2-6.

In a more preferred embodiment of the present invention, R is benzene, R' is an aliphatic hydrocarbon group containing 5 carbon atoms, p is 2, X is bromine and n is 4. An even more preferred embodiment of the present invention is an ether having the formula:

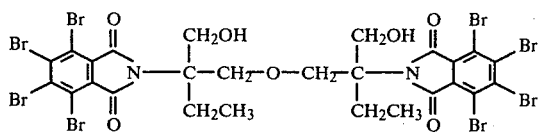

Alternatively, R may represent an alicyclic group. R is preferably 5-norbornene, R' is an aliphatic hydrocarbon group containing 5 carbon atoms, p is 2, X is chlorine and n is 6. A preferred embodiment of the present invention is an ether having the formula:

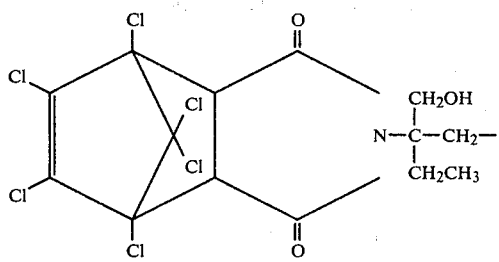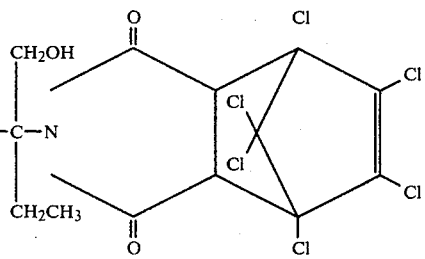

A method of producing the reaction product of the present invention involves reacting a halogenated dicarboxylic anhydride with an alcohol and an aminopolyol.

The reactants may be added concurrently or sequentially. The order of mixing the reactants does not affect the final product obtained but the intermediate formed will be different in each case.

If the halogenated dicarboxylic anhydride is initially combined with the alcohol alone, an acid-ester intermediate is formed. This intermediate is then reacted with the aminopolyol and heated to form the halogenated imide-containing polyol and the corresponding ether of the present invention.

Alternatively, if all three reactants are combined, an amide-acid intermediate results. Upon oven heating, the same halogenated imide-containing polyol and ether are formed.

Halogenated dicarboxylic anhydride compounds used in preparing the reactive flame retardant mixtures of the present invention have the structure:

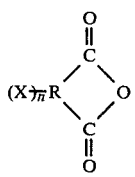

wherein R is a hydrocarbon group having the valence $n+2$ and is selected from the group consisting of benzene groups, naphthalene groups and alicyclic hydrocarbon groups containing 5 to 10 carbon atoms, X is selected from the group consisting of bromine and chlorine and n is an integer from 1 to 6. Typical halogenated dicarboxylic anhydrides include:
3-chlorophthalic anhydride,
4-bromophthalic anhydride,
3,6-dibromophthalic anhydride,
tetrabromophthalic anhydride,
tetrachlorophthalic anhydride,
1,4,5,6,7,7-hexachlorobicyclo(2.2.1)-5-heptene-2,3-dicarboxylic anhydride,
1,4,5,6,7,7-hexachloro-2-methylbicyclo(2.2.1)-5-heptene-2,3-dicarboxylic anhydride,
1,4,5,6,7,7-hexachlorobicyclo(2.2.1)-5-heptene-2-acetic-2-carboxylic anhydride
5,6,7,8,9,9-hexachloro-1,2,3,4,4a,5,8,8a-octahydro-5,8-methano-2,3-naphthalene dicarboxylic anhydride,
1,2,3,5,6,7,7-octachloro-3,6-methano-1,2,3,6-tetrahydrophthalic anhydride,
1,4-dichloro-2,3-naphthalene-dicarboxylic anhydride and
1,4-dibromo-2,3-naphthalene-dicarboxylic anhydride.

Mixtures of any of the above anhydrides may also be employed as well as mixtures of the above anhydrides and non-halogenated anhydrides. Preferably, the halogenated dicarboxylic anhydride is tetrabromophthalic anhydride.

The alcohol intended for use in making the compounds of this invention contains 1–10 carbon atoms. Examples include methanol, ethanol, isopropyl alcohol, sec-butyl alcohol, 2-pentanol, 2-heptanol, 3-propyl-2-hexanol, ethylene glycol, propylene glycol, and the like. Preferably, the alcohol is isopropyl alcohol.

Assuming the halogenated dicarboxylic anhydride is initially combined with the alcohol alone, an acid-ester intermediate is formed. The amount of the alcohol to be reacted with the halogenated dicarboxylic acid in this case should be enough to at least partially esterify the dicarboxylic acid. At least 0.3 moles of alcohol should be used per mole of halogenated dicarboxylic anhydride. However, an excess of alcohol is typically used since the alcohol may function both as a reactant and as a solvent. It is generally convenient to use a maximum of about 50 moles of alcohol per mole of halogenated dicarboxylic anhydride.

The reaction should be carried out at a temperature high enough to allow the reaction to proceed, yet not so high as to cause degradation of the reactants. The preferred temperature range is from about 25° C. to about 200° C. A more preferred temperature range is from about 50° C. to about 150° C. Usually the alcohol and halogenated dicarboxylic anhydride are brought to reflux.

The acid-ester intermediate formed by the reaction of the alcohol and dicarboxylic anhydride has the formula:

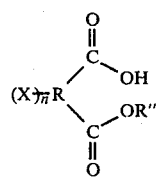

wherein R is a hydrocarbon group having the valence $n+2$ and is selected from the group consisting of benzene groups, naphthalene groups and alicyclic hydrocarbon groups containing 5 to 10 carbon atoms, X is selected from the group consisting of bromine and chlorine and n is an integer from 1-6. R'' is an aliphatic hydrocarbon group containing 1-10 carbon atoms.

The acid-ester intermediate is reacted with an aminopolyol having the structure $H_2N—R'—(OH)_p$, wherein R' is an aliphatic hydrocarbon group containing 2-6 carbon atoms having the valence p+1 and p is an integer from 2-6. Typical aminopolyols include 2-amino-2-ethyl-1,3-propanediol, tris-hydroxymethyl-aminomethane, and the like. Preferably, the aminopolyol is 2-amino-2-ethyl-1,3-propanediol.

The amount of aminopolyol necessary should be sufficient to react with the acid-ester intermediate formed by the reaction of the alcohol and dicarboxylic anhydride. Typically, from about 0.5 to about 2.5 moles of aminopolyol may be used per mole of halogenated dicarboxylic anhydride. Preferably, 0.8 to 2.0 moles of aminopolyol are used per mole of halogenated dicarboxylic anhydride. More preferably, about one mole of aminopolyol is used per mole of halogenated dicarboxylic anhydride.

The reaction should be carried out at a temperature high enough to allow the reaction to proceed, yet not so high as to cause degradation of the reactants and products. The preferred temperature range is from about 50° C. to about 350° C. A more preferred temperature range is from about 100° C. to about 250° C. An even more preferred temperature range is from 140° C. to 180° C.

In addition to the above stepwise procedure, the alcohol, halogenated dicarboxylic anhydride and aminopolyol may be added at the same time to form the combined reaction mixture. In this case, the alcohol functions almost exclusively as a solvent. The same quantities of the three reactants as indicated above are preferred. The reaction product is the halogenated imide-containing polyol and the corresponding ether of the present invention. The halogenated imide-containing polyol and ether act as flame retardant additives when used both individually and in combination.

A flame retardant amount of the halogenated imide-containing polyols and ethers as prepared above are incorporated into thermoplastic compositions to impart flame retardant properties. These imide-containing polyols and ethers may be present in the final product in concentrations from about 2% to about 40%. They normally range from about 5% to about 20%. After the thermoplastic composition is prepared, it is melted under heat and pressure. The flame retarded additives of the present invention are then blended into the thermoplastic composition in the liquid state.

Along with the flame retardant additives of the present invention, a variety of synergists may be employed to impart flame retardant properties to the present invention. Inorganic synergists include antimony oxide, zinc oxide, zinc borate, and the like. Examples of organic synergists are tris-2-chloroethylphosphate, tris-2,3-dibromo-propylphosphate, polyammonium phosphate, and the like.

The following examples illustrate the nature of the invention.

EXAMPLE I

A mixture of 50 ml. isopropyl alcohol and 46.4 g tetrabromophthalic anhydride was brought to reflux. A solution of 11.9 g 2-amino-2-ethyl-1,3-propanediol in 50 ml of isopropyl alcohol was then added over a period of thirty minutes. After refluxing for twenty-two hours the solution was evaporated to dryness to give 64.8 g of residue with an acid number of 20. A 3.7 g sample was heated in an oven at 140° C. for twenty-four hours to give a substance with an acid number of 2.7. Another sample was heated to 150° C. for twenty-four hours to give a substance with an acid number of 2.8. After oven heating the mixture contained 2-[1,1-bis(hydroxymethyl)propyl]4,5,6,7-tetrabromo-1H-isoindole-1,3(2H-dione and 2,2'-[oxybis[1-ethyl-1-(hydroxymethyl)-2,1-ethanediyl]]bis[4,5,6,7-tetrabromo-1H-isoindole-1,3(2H)-dione]. Infrared spectroscopy indicated the presence of an ether linkage.

EXAMPLE II

A mixture of 0.52 g of potassium carbonate, 100 ml. of isopropyl alcohol and 47.6 g of 2-amino-2-ethyl-1,3-propanediol was heated to 70° C. Then 185.6 g of tetrabromophthalic anhydride was added to the mixture and refluxed for four hours. After cooling to 25° C., the contents were poured into a glass dish and placed in a forced air oven at 105° C. for two days. A residue of 247.8 g which had an acid number of 24.6 resulted.

A 60 g sample was heated at 140° C. for six hours to give a 55.3 g residue (101% yield) acid number 13.6.

A 60 g sample was heated at 160° C. for six hours to give a 51.8 g residue (94.7% yield) acid number 2.9, hydroxyl number 161.3.

A 60 g sample was heated to 180° C. for six hours to give a 51.0 g residue (93.2% yield), acid number 3.3, hydroxyl number 111.7.

After oven heating the mixture contained 2-[1,1-bis-(hydroxymethyl)propyl]-4,5,6,7-tetrabromo-1H-isoindole-1,3(2H)-dione and 2,2'-[1-ethyl-1-(hydroxymethyl)-2,-ethanediyl]]bis[4,5,6,7-tetrabromo-1H-isoindole-1,3(2H)-dione].

EXAMPLE III

The procedure in Example II was repeated except that the whole reaction product was heated at 160° C. for five hours to give a product with an acid number of 2.8 and a hydroxyl number of 118.0. The mixture was identified as 2-[1,1-bis-(hydroxymethyl)propyl]-4,5,6,7-tetrabromo-1H-isoindole-1,3(2H)-dione and 2,2'-[1-ethyl-1-(hydroxymethyl)-2,-ethanediyl]]bis[4,5,6,7-tetrabromo-1H-isoindole-1,3(2H)-dione]. This product was evaluated in a polyurethane foam.

Three different samples as prepared in Example III were incorporated into a medium impact polystyrene slab to evaluate for flame retardancey.

The ingredients used to prepare these polystyrene samples were Shell DP 3037 (a trademark of Shell Chemical Company), antimony oxide and the flame retardant product from Example III. Shell DP 3037 is a high heat, medium impact polystyrene resin with an izod impact strength of 1.2 ft. lb./inch notch and a deflection temperature of 192° F. (264 psi). Antimony oxide acts a synergist and is used along with the flame retardant mixture from Example III to provide improved flame retardant properties. The Shell DP 3037, antimony oxide and the product from Example III were charged to a roller type Brabender bowl at 176°-180° C. stock temperature for 15 minutes and 66 rpm. Slabs were prepared from the mixed formula in a hot press at 190° C. and 25,000 pounds pressure and cooled under pressure. Samples for testing were trimmed to meet the size requirements for Oxygen Index and UL-94 test procedures.

The Oxygen Index Test is defined as the minimal volume fraction of oxygen in a slowly rising gaseous atmosphere that will sustain the candle like burning of a stick of polymer. The higher the Oxygen Index of a molded article, the more flame retardant it is.

The UL-94 vertical burn test is used to classify polymer specimens as V-0, V-1, V-2 and burn. Polymer specimens are held vertically and ignited at the bottom. Classification is based on burn times, the presence or absence of flaming drip and the presence and extent of afterglow.

The following table is a comparison of the flame retardant properties of a medium impact polystyrene prepared by adding various amounts of the flame retardant product from Example III and antimony oxide.

| Sample | EVALUATION OF FLAME RETARDANCE IN POLYSTYRENE | | |
|---|---|---|---|
| | A | B | C |
| SHELL DP 3037 | 100 | 86.4 | 81.8 |
| MIXTURE FROM EXAMPLE III | — | 10.6 | 14.2 |
| ANTIMONY OXIDE | — | 3.0 | 4.0 |
| OXYGEN INDEX | 18.1 | 23.1 | 23.8 |
| UL-94 | Burns | Burns | V-0 |
| % BROMINE | 0.0 | 6.0 | 8.0 |

As the amount of the flame retardant additive mixture from Example III is increased, a noticeable improvement in the flame retardant properties of the thermoplastic polymer results.

We claim:

1. A thermoplastic polymer containing a flame retardant amount of a flame retardant additive mixture, said flame retardant additive mixture comprising halogenated imide-containing polyol having the formula:

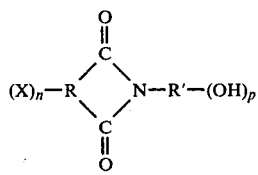

and the corresponding ethers having the formula:

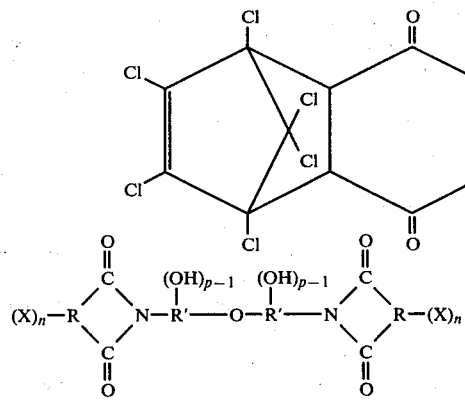

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3-12 carbon atoms, X is selected from the group consisting of bromine and chlorine, n is an integer from 1-6 and p is an integer from 2-6.

2. A flame retardant polymer, as recited in claim 1, wherein R' is an aliphatic hydrocarbon group containing 5 carbon atoms and p is 2.

3. A flame retardant polymer, as recited in claim 2, wherein R is benzene, X is bromine and n is 4.

4. A flame retardant polymer, as recited in claim 3, wherein said halogenated imide-containing polyol has the formula:

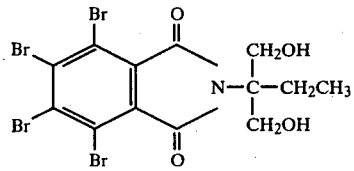

and said corresponding ether has the formula:

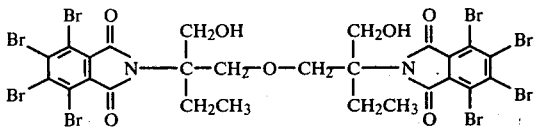

5. A flame retardant polymer, as recited in claim 2, wherein R is 5-norbornene, X is chlorine and n is 6.

6. A flame retardant polymer, as recited in claim 5, wherein said halogenated imide-containing polyol has the formula:

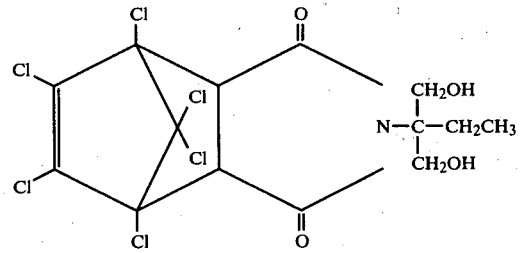

and said corresponding ether has the formula:

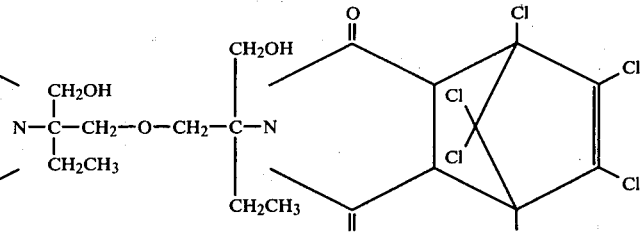

7. A flame retardant thermoplastic polymer containing a flame retardant amount of a flame retardant additive having the formula:

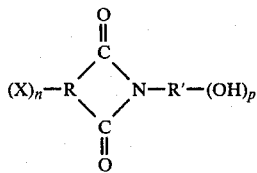

wherein R is a benzene group, R' is an aliphatic hydrocarbon group containing 3–12 carbon atoms, X is selected from the group consisting of bromine and chlorine, n is an integer from 1–6 and p is an integer from 2–6.

8. A flame retardant polymer, as recited in claim 7, wherein R' is an aliphatic hydrocarbon group containing 5 carbon atoms and p is 2.

9. A flame retardant polymer, as recited in claim 8, wherein X is bromine and n is 4.

10. A flame retardant polymer, as recited in claim 9, having the formula:

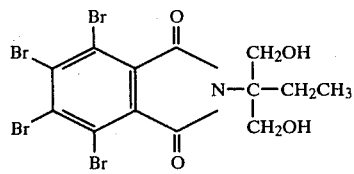

11. A flame retardant thermoplastic polymer containing a flame retardant amount of flame retardant additive having the formula:

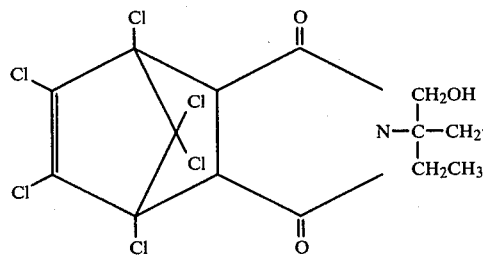

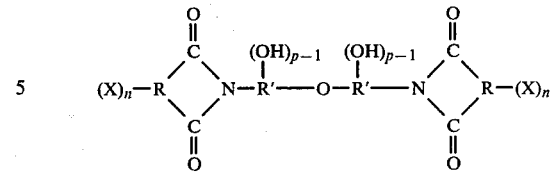

wherein R is a hydrocarbon group having the valence n+2 and is selected from the group consisting of benzene groups, naphthalene groups and alicyclic hydrocarbon groups containing 5 to 10 carbon atoms, R' is an aliphatic hydrocarbon group containing 3–12 carbon atoms, X is selected from the group consisting of bromine and chlorine, n is an integer from 1–6 and p is an integer from 2–6.

12. A flame retardant polymer, as recited in claim 11, wherein R' is an aliphatic hydrocarbon group containing 5 carbon atoms and p is 2.

13. A flame retardant polymer, as recited in claim 12, wherein R is benzene, X is bromine and n is 4.

14. A flame retardant polymer, as recited in claim 13, having the formula:

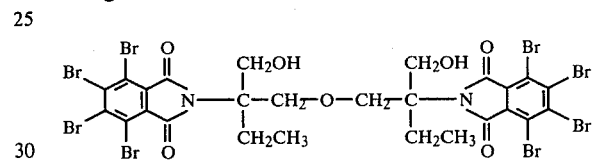

15. A flame retardant polymer, as recited in claim 12, wherein R is 5-norbornene, X is chlorine and n is 6.

16. A flame retardant polymer, as recited in claim 15, having the formula:

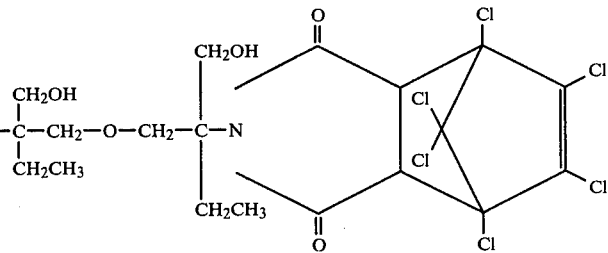

* * * * *